J. J. HOPPER.
BEAM-SCALE.

No. 177,515. Patented May 16, 1876.

UNITED STATES PATENT OFFICE.

JACOB J. HOPPER, OF NEW YORK, N. Y.

IMPROVEMENT IN BEAM-SCALES.

Specification forming part of Letters Patent No. 177,515, dated May 16, 1876; application filed January 3, 1876.

*To all whom it may concern:*

Figure 1:
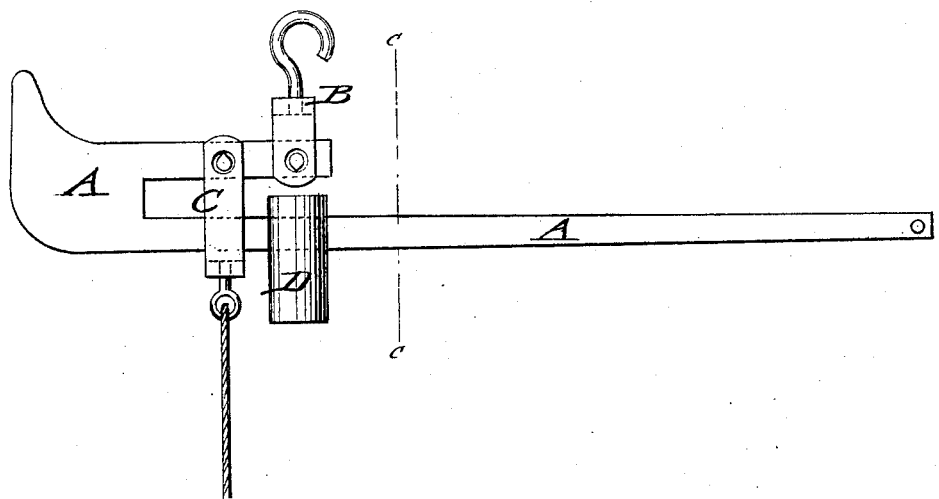
Figure 2:
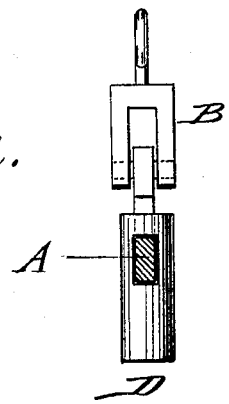

Be it known that I, JACOB J. HOPPER, of the city, county, and State of New York, have invented a new and Improved Beam-Scale, of which the following is a specification:

Figure 1 represents a side view of my improved beam-scale; and Fig. 2 a vertical transverse section of the same on line $c\ c$, Fig. 1.

Similar letters of reference indicate corresponding parts.

My invention relates to an improved beam-scale for weigh-masters, ice-wagons, and other purposes, by which the weight is not required to be placed upon and detached from the beam for each weighing, but held suspended thereon, allowing the more convenient and ready use of the scale.

The invention consists of a beam-scale, in which the beam is made of U-shape, with the suspension-fulcrum at the upper shorter leg, the weight being hung below the fulcrum and sliding along the lower extended leg.

The beam-scales at present in use by weigh-masters, ice-wagons, &c., are made of a beam balanced on a fulcrum of suspension.

The object to be weighed is hung to one end and the weight placed and moved along the other graduated end, requiring to be detached and replaced for each weighing. This is not only connected, especially when heavy articles are to be weighed, with considerable inconvenience, but also with loss of time.

My beam-scale is intended to avoid these defects by retaining the weight on the beam, and balancing the object more readily thereby.

In the drawing, A represents my improved beam-scale, which is made in the shape of a horizontal U, whose lower leg is made considerably longer than the upper leg.

The U-shaped beam is pivoted, by knife-edges of its shorter leg, to a suspension-fulcrum and hook, B, that is applied to a suitable supporting-frame, fixed arm, or otherwise. The hook, disk, or other article on which the article to be weighed is applied, is also suspended on a fulcrum, C, from knife-edges of the shorter leg at some distance from the suspension-fulcrum, it being balanced by the weight D, that slides along the longer leg or beam, which is graduated in the usual manner to indicate the weight of the object. The weight D is slid below the point of suspension of the scale after the weight of the object is determined, being thereby always in position on the beam ready for use. An indicator of the beam marks the balance of object and sliding weight, while a button, pin, or other device at the outer end of the beam prevents the slipping off of the weight. When the weight is below the suspension-fulcrum the scale is thrown out of function, as the weight is perpendicularly below the same and exerts no influence.

The scale may be readily used, and forms a more practical weighing device for various purposes than those at present employed.

Having thus described my invention, I claim as new and desire to secure by Letters Patent—

The beam A, having a lower long and upper short arm, the latter provided with pivoted fulcrum-piece B, and to one side of it with a hanger, C, while the former has a sliding weight, D, as shown and described, whereby the weight need never be lifted off, but simply slided up under the fulcrum.

JACOB J. HOPPER.

Witnesses:
PAUL GOEPEL,
T. B. MOSHER.